US012365745B2

(12) United States Patent
Cimpeanu et al.

(10) Patent No.: US 12,365,745 B2
(45) Date of Patent: Jul. 22, 2025

(54) METHOD FOR PRODUCING AN AQUEOUS POLYMER DISPERSION FROM A VINYL AROMATIC COMPOUND AND A CONJUGATED ALIPHATIC DIENE

(71) Applicant: BASF SE, Ludwigshafen am Rhein (DE)

(72) Inventors: Carmen-Elena Cimpeanu, Ludwigshafen am Rhein (DE); Dirk Lawrenz, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 769 days.

(21) Appl. No.: 17/617,402

(22) PCT Filed: May 28, 2020

(86) PCT No.: PCT/EP2020/064897
§ 371 (c)(1),
(2) Date: Dec. 8, 2021

(87) PCT Pub. No.: WO2020/249406
PCT Pub. Date: Dec. 17, 2020

(65) Prior Publication Data
US 2022/0251248 A1 Aug. 11, 2022

(30) Foreign Application Priority Data
Jun. 12, 2019 (EP) ..................... 19179680

(51) Int. Cl.
C09D 109/06 (2006.01)
C08F 2/26 (2006.01)
C08F 2/38 (2006.01)
C08F 212/08 (2006.01)
C08F 220/06 (2006.01)
C08F 236/06 (2006.01)
C09D 125/10 (2006.01)
D21H 19/58 (2006.01)

(52) U.S. Cl.
CPC .............. C08F 2/26 (2013.01); C08F 2/38 (2013.01); C08F 212/08 (2013.01); C08F 220/06 (2013.01); C08F 236/06 (2013.01); C09D 109/06 (2013.01); C09D 125/10 (2013.01); D21H 19/58 (2013.01)

(58) Field of Classification Search
CPC .. C08F 2/38; C08F 2/26; C08F 212/08; C08F 220/06; C08F 236/06; D21H 19/58; C09D 109/06; C09D 125/10
USPC ........................................ 524/457
See application file for complete search history.

(56) References Cited

U.S. PATENT DOCUMENTS

| | | | |
|---|---|---|---|
| 4,269,749 A | 5/1981 | Marriott et al. | |
| 4,567,099 A | 1/1986 | Van Gilder et al. | |
| 4,780,503 A | 10/1988 | Mallya | |
| 5,726,259 A | 3/1998 | Hayes et al. | |
| 2006/0149345 A1 | 7/2006 | Boggs et al. | |
| 2007/0060980 A1 | 3/2007 | Strother et al. | |
| 2009/0210019 A1 | 8/2009 | Kim et al. | |
| 2011/0281130 A1* | 11/2011 | Evstatieva | C08F 2/38 524/556 |
| 2011/0305916 A1 | 12/2011 | Schmidt-Thümmes et al. | |
| 2014/0214125 A1 | 7/2014 | Greiner et al. | |

FOREIGN PATENT DOCUMENTS

| | | |
|---|---|---|
| DE | 4419518 A1 | 12/1995 |
| DE | 4435422 A1 | 4/1996 |
| DE | 4435423 A1 | 4/1996 |
| EP | 0926160 A1 | 6/1999 |
| EP | 2197925 A1 | 6/2010 |
| EP | 2580257 A1 | 4/2013 |
| WO | 2009/047233 A1 | 4/2009 |

OTHER PUBLICATIONS

Peter et al., "Styrene-butadiene and styrene-acrylic latices in paper coating applications", Coating Material: Pigment, Binders & Additives Short Course, 2002, pp. 115-123.
International Search Report and Written Opinion received for PCT Patent Application No. PCT/EP2020/064897, mailed on Jul. 13, 2020, 11 pages (2 pages of English Translation and 9 pages of Original Document).

* cited by examiner

Primary Examiner — Ruiyun Zhang
(74) Attorney, Agent, or Firm — Faegre Drinker Biddle & Reath LLP

(57) ABSTRACT

A process for preparing an aqueous polymer dispersion by radically initiated aqueous emulsion polymerization of
(a) 40 to 75 parts by weight of at least one vinylaromatic compound,
(b) 24.9 to 59.9 parts by weight of at least one conjugated aliphatic diene,
(c) 0.1 to 10 parts by weight of at least one monomer containing acid groups, and
(d) 0 to 20 parts by weight of at least one other monoethylenically unsaturated monomer,
in an aqueous medium by a monomer feed process. Monomers and emulsifier are metered continuously and, when 15 to 30% of the total monomer metering time has elapsed and 15 to 30 wt % of the total monomer amount has been metered in, the metering rate of the emulsifier is increased for a period lasting no longer than 30 minutes to 10 to 100 times the average metering rate of the emulsifier.

12 Claims, No Drawings

METHOD FOR PRODUCING AN AQUEOUS POLYMER DISPERSION FROM A VINYL AROMATIC COMPOUND AND A CONJUGATED ALIPHATIC DIENE

CROSS-REFERENCE TO RELATED APPLICATIONS

This application is a national stage application (under 35 U.S.C. § 371) of PCT/EP2020/064897, filed May 28, 2020, which claims benefit of European Application No. 19179680.4, filed Jun. 12, 2019, both of which are incorporated herein by reference in their entirety.

The invention relates to a process for preparing an aqueous polymer dispersion having a polymodal particle distribution of the polymer particles by copolymerizing a vinylaromatic compound and a conjugated aliphatic diene. The invention also relates to the aqueous polymer dispersions prepared by the process and to the use thereof as a binder, adhesive, fiber sizing agent, for producing coatings or for producing a paper coating slip.

Binders for paper coating slips based on copolymers of vinylaromatic compounds and aliphatic dienes are often chosen for applications such as card for the packaging of foodstuffs, for instance. Importance is attached here, during their preparation, to low-odor dispersions, since this field of application is odor-sensitive.

As a result of ever further increase in the production speed of the paper machines, however, there are also increases in the requirements regarding the rheology of the coating slip. In spite of the high fraction of pigment, which is indeed coarser than the binder polymer, the latter has a strong influence on the rheology of a coating slip. The viscosity of the coating slip could be lowered by means of greater dilution, and yet the opposite is desired. Accordingly, modern dispersions are to enable a high solids content in the coating slip while nevertheless themselves having a low viscosity at high speeds.

Peter C. Hayes describes how at high solids contents of coating slips containing styrene-butadiene binder, the running behavior is improved by small particle sizes for the binder ("*Styrene-butadiene and styrene-acrylic latexes in paper coating applications*", Coating Material: Pigment Binders & Additives Short Course, Orange Beach, Ala., United States, Mar. 11-13, 2002, pages 115-123, TAPPI PRESS, Atlanta, 2002).

One possibility for controlling the particle size of a polymer dispersion is by using a seed latex. However, the monomodal dispersions prepared by this route form a high fraction of fine coagulum, which over the course of time balls up into larger aggregates, blocks filter systems, and becomes unsuitable for use in the paper coating.

U.S. Pat. No. 4,567,099 teaches the use of a blend of two styrene-butadiene dispersions in paper coating applications. The mixing of two dispersions leads in general to a dilution of the overall dispersion, since dispersions with a small particle size can be prepared only with a relatively low solids content. Higher solids contents are achieved only through subsequent, energy-intensive concentration of the blend. Moreover, two dispersions must first be prepared, and this represents a poor space/time yield for the overall product.

U.S. Pat. No. 5,726,259 teaches the direct preparation of a bimodal styrene/butadiene latex binder for paper coating slips. The latex binder is prepared by starting the polymerization with an in situ seed, adding the monomers in portions by means of 10 monomer additions, and adding an increased amount of emulsifier after 43 wt % of the total monomer amount and 44% of the total monomer metering time. This process entails very laborious metering and therefore has a poor space/time yield. A further disadvantage is that sulfur-containing chain transfer agents are used in order to attain the desired product properties.

U.S. Pat. No. 4,780,503 describes a bimodal polymer dispersion whose preparation entails adding lauryl ether sulfate or additional seed latex at a point in time of more than 40% monomer conversion. According to this teaching, dispersions with a relatively high solids content and low viscosity are obtained. However, the viscosities obtained accordingly are still too high for present-day running speeds of coating machines. Application as a paper coating binder is not taught.

It was an object of the present invention, therefore, to prepare polymer dispersions having a pronounced bimodal particle size distribution, obtained by polymerizing vinylaromatic compound and conjugated aliphatic diene, with low technological outlay and with an improved space/time yield. These polymer dispersions are intended to contain relatively little fine coagulum and, moreover, to be low in odor. When incorporated into paper coating slips, they are also to exhibit good rheological behavior under high shearing forces.

The object is achieved in accordance with the invention by means of a process for preparing an aqueous polymer dispersion having a polymodal particle distribution of the polymer particles, with a first population of large polymer particles and a second population of small polymer particles, by radically initiated aqueous emulsion polymerization, which comprises polymerizing

| | | |
|---|---|---|
| (a) | 40 to 75 parts by weight of | at least one vinylaromatic compound, |
| (b) | 24.9 to 59.9 parts by weight of | at least one conjugated aliphatic diene, |
| (c) | 0.1 to 10 parts by weight of | at least one monomer containing acid groups, and |
| (d) | 0 to 20 parts by weight of | at least one other monoethylenically unsaturated monomer, | where the amounts of the monomers (a) to (d) add up to 100 parts by weight, in an aqueous medium by a monomer feed process, with the proviso that monomers and emulsifier are metered continuously and following a period P1, when 15 to 30% of the total monomer metering time has elapsed and 15 to 30 wt % of the total monomer amount has been metered in, the metering rate of the emulsifier is increased for a period P2 lasting no longer than 30 minutes to 10 to 100 times the average metering rate of the emulsifier in the period P1.

Quantities stated in parts by weight below refer unless otherwise indicated to 100 parts by weight of total monomers.

The term "polymodal" is familiar to the skilled person and denotes a particle size distribution having two or more maxima over the entire population of the dispersion.

"Small polymer particles" and "large polymer particles" refer only to relative indications in relation to the particle size. The indication "small polymer particles" is used synonymously for "population of small polymer particles", and the indication "large polymer particles" is used synonymously for "population of large polymer particles".

Unless otherwise indicated, indications of the particle size and also of the particle size distribution of the polymer particles are indications made on the basis of the analytical ultracentrifuge (AUC), which is described below.

Compounds which may derive from acrylic acid and methacrylic acid are in some cases designated below in abbreviated form by the insertion of the syllable "(meth)" into the compound derived from acrylic acid.

The total monomer amount is the total amount of all monomers used in the polymerization, including the monomers in any initial charge present. The total monomer amount is 100 parts by weight of monomer.

Any reference to the metered-in total monomer amount is to the total monomer amount minus the monomers in the initial charge.

The total metering time of the monomers is the period of time for which the continuous metering of monomers lasts. Metering may take place in the form of the addition of a mixture and also in the form of separate monomers, the addition of which may also commence with a time offset. It is critical that monomer is metered in at every point in time—that is, the addition is continuous. Correspondingly, the total metering time begins with the beginning of the metered addition of the first monomer/monomer mixture and ends with the end of the metering of the last monomer/monomer mixture.

The metering rate refers to a quantity which is added in one time unit, in other words "amount per unit time", typically in "g/min". For example, the average metering rate of the period P1 of the emulsifier is the amount of all emulsifiers metered in during the period P1, relative to the temporal duration of the period.

The aqueous polymer dispersions may be prepared using ethylenically unsaturated monomers (a), (b), (c), and (d) below.

Vinylaromatic compounds (monomers of group (a)) contemplated include, for example, styrene, α-methylstyrene and/or vinyltoluene. From this group of monomers, styrene preferably is chosen.

The monomers (a) account for a fraction of 40 to 75 parts by weight and preferably 45 to 70 parts by weight, more particularly 50 to 65 parts by weight, based on 100 parts by weight of total monomers (a to c and optionally d).

Examples of conjugated aliphatic diene (monomers of group (b)) include buta-1,3-diene, isoprene, penta-1,3-diene, dimethylbuta-1,3-diene and cyclopentadiene. From this group of monomers, buta-1,3-diene and/or isoprene are preferably employed.

The total amount of the monomers (b) is 24.9 to 59.9 parts by weight, preferably 29.9 to 54.9 parts by weight and more particularly 34.9 to 49.9 parts by weight, based on 100 parts by weight of total monomers.

Examples of monomers containing acid groups (monomers (c)) include ethylenically unsaturated carboxylic acids, ethylenically unsaturated sulfonic acids and vinylphosphonic acid. Ethylenically unsaturated carboxylic acids used are preferably α,β-monoethylenically unsaturated monocarboxylic and dicarboxylic acids which have 3 to 6 carbon atoms in the molecule. Examples thereof are acrylic acid, methacrylic acid, itaconic acid, maleic acid, fumaric acid, crotonic acid, vinylacetic acid and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preference is given to using acrylic acid, methacrylic acid and itaconic acid. The stated acids may be used either as a single component or in a combination thereof.

The monomers containing acid groups may be used in the polymerization in the form of the free acids and also in a form partially or completely neutralized with suitable bases. The neutralizing agent used is preferably sodium hydroxide solution, potassium hydroxide solution or ammonia.

The total amount of the monomers (c) is 0.1 to 10 parts by weight, preferably 0.1 to 8 parts by weight or 1 to 6 parts by weight, based on 100 parts by weight of total monomers.

Other monoethylenically unsaturated monomers (d) are monomers different from the monomers of groups (a), (b) and (c). They are preferably selected from acrylamide and methacrylamide, vinyl esters of saturated $C_1$ to $C_{18}$ carboxylic acids, preferably vinyl acetate, and also esters of acrylic acid and of methacrylic acid with monohydric $C_1$ to $C_{18}$ alcohols, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate, allyl esters of saturated carboxylic acids, vinyl ethers, vinyl ketones, dialkyl esters of ethylenically unsaturated carboxylic acids, N-vinylpyrrolidone, N-vinylpyrrolidine, N-vinylformamide, N,N-dialkylaminoalkylacrylamides, N,N-dialkylaminoalkylmethacrylamides, N,N-dialkylaminoalkylacrylates, N,N-dialkylaminoalkyl methacrylates, vinyl chloride and vinylidene chloride (monomers of group (d)).

This group of monomers is used optionally for modifying the polymers. The total amount of all other monomers may be up to 20 parts by weight, based on 100 parts of total monomer. Based on 100 parts by weight of the total monomers, the fraction of one or more monomers of group (d) is 0 to 20 parts by weight, preferably 0.1 to 15 parts by weight and more particularly 0.5 to 10 parts by weight.

Where acrylonitrile and/or methacrylonitrile are involved, they are each used preferably in an amount of 2 to 12 parts by weight and more particularly of 4 to 9 parts by weight, based on 100 parts by weight of total monomer.

In a preferred process the vinylaromatic compound is styrene and/or methylstyrene and the conjugated aliphatic diene is 1,3-butadiene and/or isoprene. Particular advantage attaches to the process for preparing styrene-butadiene dispersions.

Polymerized advantageously are

| | | |
|---|---|---|
| (a) | 60 to 75 parts by weight of | at least one vinylaromatic compound and |
| (b) | 24.9 to 39.9 parts by weight of | at least one conjugated aliphatic diene |
| (c) | 0.1 to 8 parts by weight of | at least one monomer containing acid groups, and |
| (d) | 0 to 10 parts by weight of | at least one other monoethylenically unsaturated monomer, | where the amounts of the monomers (a) to (d) add up to 100 parts by weight.

Polymerized with more particular preference are

| | | |
|---|---|---|
| (a) | 60 to 70 parts by weight of | at least one vinylaromatic compound and |
| (b) | 29 to 39 parts by weight of | at least one conjugated aliphatic diene |
| (c) | 1 to 6 parts by weight of | at least one monomer containing acid groups, and |
| (d) | 0 to 5 parts by weight of | at least one other monoethylenically unsaturated monomer, | where the amounts of the monomers (a) to (d) add up to 100 parts by weight.

The emulsion polymerization takes place in an aqueous medium. This may be, for example, fully demineralized water or else mixtures of water and a water-miscible solvent such as methanol, ethanol, ethylene glycol, glycerol, sugar alcohols such as sorbitol or tetrahydrofuran. The total amount of aqueous medium here is such that the aqueous polymer dispersion obtained has a solids content of 20 to 70 wt %, frequently 30 to 65 wt % and often 40 to 60 wt %.

The process of the invention is a monomer feed process. A monomer feed process means that the major amount, typically at least 80%, preferably at least 90%, of the monomers to be polymerized is supplied to the polymerization reaction under polymerization conditions.

It is possible here to include a portion of the monomers in an initial charge in the polymerization vessel before the beginning of the polymerization. According to this preferred variant, then, the polymerization may be initiated in an initial charge which contains up to 20 parts by weight of the total monomers and then monomers and emulsifier are metered continuously. More particularly it is possible to include up to 5% of the respective monomer in an initial charge and then to initiate the polymerization. With particular preference only the monomers (a), (b) and optionally (d) are included in the initial charge, preferably up to 5% of the respective monomer.

Polymerization conditions mean, generally, those amounts of radical initiator and those temperatures and pressures under which the radically initiated aqueous emulsion polymerization does not come to a standstill. The polymerization here is dependent primarily on the nature and amount of the radical initiator used. The relationships between temperature and decomposition rate are well known to the skilled person for the common polymerization initiators or can be ascertained in routine experiments.

In accordance with the invention the monomers and the emulsifier are metered continuously. In other words, the monomer metering and also the emulsifier metering take place in a continuous mass flow, i.e., without interruption.

The respective monomer here is metered preferably at a metering rate which deviates by not more than 30%, preferably not more than 20%, from the average value of the respective total feed of this monomer. According to one preferred embodiment, the metering rate of the monomers (increase in the monomers) corresponds approximately to the polymerization rate of the monomers (decrease of the monomers).

Likewise there is preferably a process in which no monomers are included in an initial charge. According to one embodiment, the continuous metering of the monomers of groups (a), (b), (c) and (d), the latter if part of the total monomers, commences simultaneously.

According to one preferred embodiment, the metering of the conjugated aliphatic diene starts only at a point in time at which at least 5%, preferably at least 8%, more particularly at least 10% of the vinylaromatic compound has been metered in in a continuous mass flow. Metering of the diene starts preferably when at most 30% of the vinylaromatic compound has been metered in in a continuous mass flow.

The vinylaromatic compound is metered in under polymerization conditions preferably in a continuous mass flow over a period of at least 120 minutes, preferably over a period of 180 to 300 minutes, more particularly over a period of 210 to 270 minutes.

The conjugated aliphatic diene is metered in in a continuous mass flow preferably over a period of at least 60 minutes, more preferably over a period of 120 to 240 minutes, more particularly over a period of 150 to 210 minutes, and with particular preference the vinylaromatic compound as well is metered in in a continuous mass flow over a period of at least 120 minutes, preferably over a period of 180 to 300 minutes, more particularly over a period of 210 to 270 minutes.

In accordance with the invention, monomer and emulsifier are metered continuously. An emulsifier for the purposes of the process of the invention refers to emulsifying assistants which maintain both the monomer droplets and polymer particles in disperse distribution in the aqueous phase and hence ensure the stability of the aqueous polymer dispersion generated. As such, the emulsifiers typically employed in performing radical aqueous emulsion polymerizations are contemplated.

Emulsifiers contemplated include surface-active substances whose number-average molecular weight is typically below 2000 g/mol or preferably below 1500 g/mol.

Suitable emulsifiers include anionic, cationic and nonionic emulsifiers. Preferred for use as surface-active substances are emulsifiers, whose relative molecular weights are typically below those of protective colloids.

Useful nonionic emulsifiers are araliphatic or aliphatic nonionic emulsifiers, examples being ethoxylated mono-, di- and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$), and also polyethylene oxide/polypropylene oxide homopolymers and copolymers. These may comprise the alkylene oxide units in statistical distribution or in the form of blocks, in copolymerized form. Highly suitable, for example, are EO/PO block copolymers. Preference is given to using ethoxylates of long-chain alkanols (alkyl radical $C_1$-$C_{30}$, mean degree of ethoxylation 5 to 100) and, of these, particular preference to those having a linear $C_{12}$-$C_{20}$ alkyl radical and a mean degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), of alkylarylsulfonic acids (alkyl radical: $C_9$-$C_{18}$) and of diesters of sulfosuccinic acid with $C_4$-$C_{18}$ alkanols. Further suitable emulsifiers are found in Houben-Weyl, Methoden der organischen Chemie, volume XIV/1, Makromolekulare Stoffe [Macromolecular compounds], Georg-Thieme-Verlag, Stuttgart, 1961, pp. 192-208. Likewise suitable as anionic emulsifiers are bis(phenylsulfonic acid) ethers and/or the alkali metal salts or ammonium salts thereof which carry a $C_4$-$C_{24}$ alkyl group on one or both aromatic rings. These compounds are common knowledge, from U.S. Pat. No. 4,269,749, for example, and available commercially, in the form for example of Dowfax® 2A1 (Dow Chemical Company).

Preferably at least one anionic and/or at least one nonionic emulsifier are/is used.

The emulsifier of the continuous metering is preferably selected from alkali metal salts and ammonium salts of $C_8$-$C_{22}$ alkyl sulfates and of sulfuric monoesters with ethoxylated alkanols (EO degree: 2 to 40, alkyl radical: $C_{12}$-$C_{18}$) and of sulfuric monoesters with ethoxylated alkylphenols (EO degree: 10 to 40, alkyl radical: $C_4$-$C_9$), and from bis(phenylsulfonic acid) ethers and/or the alkali metal salts or ammonium salts thereof which carry a $C_4$-$C_{24}$ alkyl group on one or both aromatic rings.

Particular preference is given to using a mixture of emulsifiers, in each case in the form of their alkali metal salts and ammonium salts, more particularly a mixture of alkyl sulfates (alkyl radical: $C_8$-$C_{22}$) with sulfuric monoesters of ethoxylated alkanols (EO degree: 2 to 40, alkyl radical: $C_{12}$-$C_{18}$) or with sulfuric monoesters of ethoxylated alkylphenols (EO degree: 10 to 40, alkyl radical: $C_4$-$C_9$) or with 2-ethylhexyl sulfosuccinate, or a mixture of alkali metal salts and ammonium salts of alkyl sulfates with bis(phenylsulfonic acid) ether and/or the alkali metal salts or ammonium salts thereof which carry a $C_4$-$C_{24}$ alkyl group on one or both aromatic rings (e.g. Dowfax® 2A1 from Dow Chemical Company).

Particular preference is given to an emulsifier mixture of sodium lauryl sulfate and ethoxylated sodium lauryl ether sulfate, and also to a mixture of sodium lauryl sulfate and Dowfax® 2A1.

The continuous metering of emulsifier and monomer here may take place in separate mass flows. It is, however, advantageous to meter emulsifier and at least one monomer together as a mixture. Preferably 0.1 to 5 parts by weight, preferably 0.2 to 2.0 parts by weight, of emulsifier per 100 parts by weight of monomers are metered continuously in a mixture with at least one monomer.

Emulsifiers here are metered preferably at a metering rate which deviates by not more than 30%, preferably not more than 20%, from the average value of the respective total feed.

In accordance with the invention, subsequent to a period P1 when 15 to 30% of the total metering time of the monomers has elapsed and 15 to 30% of the total monomer amount has been metered in, the metering rate of the emulsifier is increased for a period P2 lasting not more than 30 minutes to 10 to 100 times the average metering rate of the emulsifier in the period P1. The period P1 starts with the beginning of the continuous metering of the monomers, in other words, where an initial charge is present, after the initiation of the polymerization in the initial charge, and ends when 15 to 30%, preferably 20 to 25%, of the total metering time of the monomers has elapsed and 15 to 30 wt %, preferably 20 to 25 wt %, of the total monomer amount has been metered in, the metering being selected such that both conditions are met.

The "period of increased metering" subsequent to the period P1 is also referred to below as "P2". The duration of the period P2 is preferably up to 25 minutes, more particularly 5 to 20 minutes. On account of the increased metering rate during the period P2, this additional emulsifier metering is also referred to as an "emulsifier shot".

Following the period P2, there is a period P3 in which the metering rate of the emulsifier may deviate upward or downward by up to 20% from the metering rate of the emulsifier in the period P1.

During the period P2 the metering rate of the emulsifier is preferably 20 to 90 times the average metering rate of the emulsifier in the period P1.

The emulsifier or emulsifier mixture used during the period P1 and the period P3 is generally the same. The emulsifier of the period P2 may be the same emulsifier as in the period P1. In the period P2, preferably, a mixture of the emulsifiers of the period P1 is used, but with a changed proportion—for example, only one of two emulsifiers is metered additionally as the "emulsifier shot".

According to one preferred embodiment, a monomer/emulsifier mixture is metered continuously over the entire feed, i.e., the period P1, P2 and P3, and additionally in the period P2 the metering rate of one of the emulsifiers in the mixture is increased.

The emulsifier of the period P2 selected is preferably an anionic emulsifier, selected more particularly from lauryl sulfate, sulfuric monoesters of ethoxylated alkanols, and arylsulfonate.

The metering is explained below illustratively for a polymerization with initiation in an initial charge and subsequent monomer metering with constant mass flow.

In example 1 the polymerization is initiated in the initial charge with 2.9 parts by weight of the total monomer amount and then the continuous metering of a mixture of monomer and emulsifier is started. The total amount of all the monomers, including the monomers of the initial charge, is 100 parts by weight (also referred to, for the purposes of this patent application, as total monomer amount). Accordingly 97.1 parts by weight are metered in continuously. The total duration of the monomer metering is 240 minutes. After 50 minutes, counting from the start of the continuous metering, an additional metering of the emulsifier is started, and lasts for 20 minutes. The increase in the emulsifier amount, the so-called emulsifier shot, is therefore made after 21% of the total metering time of the monomers. After the 50 minutes, by virtue of the constant monomer metering, 20.2 parts by weight of monomers have been metered in. Over the total metering time of 240 minutes, 0.74 part by weight of emulsifier per 100 parts by weight of total monomer is metered continuously in a mixture with the monomers. Correspondingly, after 50 minutes, 0.15 part by weight of emulsifier has been metered in. This corresponds to an average metering rate in the period P1 of 0.00308 part by weight/min. The metering of the emulsifier during the emulsifier shot is one part by weight over a period of 20 minutes, giving a metering rate of 0.05 part by weight/min. During the emulsifier shot, therefore, 0.053 part by weight/per minute is metered and hence the metering rate is 17 times (rounded; exactly: 16.6 times) the average metering rate of the emulsifier.

It is assumed that the emulsifier concentration present in the polymerization mixture during the period P1 is below the critical micelle concentration, and during the period P2 is above the critical micelle concentration. According to this theory, new micelles would be formed in the period P2 and a second particle growth would be started.

In the process of the invention, radical initiators are used (also referred to as radical polymerization initiators), these being initiators which form radicals under the reaction conditions. They may be peroxides or else azo compounds. Redox initiator systems are also contemplated, of course.

Peroxides used may in principle be inorganic peroxides and/or organic peroxides. Examples of suitable inorganic peroxides include hydrogen peroxide and also peroxodisulfates, such as the mono- or di-alkali metal or -ammonium salts of peroxodisulfuric acid, examples being its mono- and di-sodium, -potassium or -ammonium salts. Examples of suitable organic peroxides are alkyl hydroperoxides such as tert-butyl hydroperoxide, aryl hydroperoxides such as p-menthyl hydroperoxide or cumene hydroperoxide, and also dialkyl or diaryl peroxides, such as di-tert-butyl, dibenzoyl or di-cumene peroxide.

Azo compounds used are essentially 2,2'-azobis(isobutyronitrile), 2,2'-azobis(2-methylbutyronitrile), 2,2'-azobis(2,4-dimethylvaleronitrile), 2,2'-azobis(N,N'-dimethyleneisobutyroamidine) dihydrochloride and 2,2'-azobis (amidinopropyl) dihydrochloride (AIBA, corresponding to V-50 from Wako Chemicals).

Redox initiator systems are combined systems composed of at least one organic or inorganic reducing agent and at least one peroxide. Oxidizing agents contemplated for redox initiator systems are essentially the peroxides stated above. As corresponding reducing agents it is possible to use compounds of sulfur in a low oxidation state, such as alkali metal sulfites, as for example potassium and/or sodium sulfite, alkali metal hydrogensulfites, as for example potassium and/or sodium hydrogensulfite, alkali metal metabisulfites, as for example potassium and/or sodium metabisulfite, acetone bisulfite, formaldehyde-sulfoxylates, as for example potassium and/or sodium formaldehyde-sulfoxylate, alkali metal salts, especially potassium and/or sodium salts, of aliphatic sulfinic acids, and alkali metal hydrogensulfides, such as potassium and/or sodium hydrogensulfide, for example, salts of polyvalent metals, such as iron(II) sulfate, iron(II) ammonium sulfate, iron(II) phosphate, enediols, such as dihydroxymaleic acid, benzoin and/or ascorbic acid, and also reducing saccharides, such as sorbose, glucose, fructose and/or dihydroxyacetone.

Preferred radical initiators are inorganic and organic peroxides, preferably ammonium salts or alkali metal salts of peroxosulfates or peroxodisulfates, and also tert-butyl, p-menthyl and cumyl hydroperoxide, selected more particularly from sodium and potassium peroxodisulfate, tert-butyl hydroperoxide and cumyl hydroperoxide. Particular preference here is given to using both at least one inorganic peroxide, preferably peroxodisulfate, more particularly sodium peroxodisulfate, and an organic peroxide, preferably alkyl hydroperoxide, more particularly tert-butyl hydroperoxide.

In a preferred process of the invention no reducing agent which can form a red/ox initiator system with the organic or inorganic peroxides is present during the monomer feed.

Preference is given to organic peroxides which are both oil-soluble and water-soluble. For the purposes of this specification, water-soluble organic peroxides are understood to be those which have a solubility in deionized water at 20° C. under atmospheric pressure of ≥1 wt %. For the purposes of this specification, oil-soluble organic peroxides are understood to be those which have a solubility in styrene at 20° C. under atmospheric pressure of ≥1 wt %. Examples include alkyl hydroperoxides such as tert-butyl, p-menthyl or cumene hydroperoxide.

The inorganic peroxide is preferably selected from hydrogen peroxide and ammonium or alkali metal salts of peroxodisulfates and the organic peroxide is preferably selected from alkyl hydroperoxides and aryl hydroperoxides.

Particularly preferred for use are the following combinations of peroxodisulfates with alkyl hydroperoxides by way of example: sodium peroxodisulfate with tert-butyl hydroperoxide, or ammonium peroxodisulfate with tert-butyl hydroperoxide.

The polymerization takes place in general using 0.1 to 5 parts by weight of the radical initiator, preferably 0.5 to 4 parts by weight of the radical initiator, preferably of at least one inorganic and/or organic peroxide, based in each case on 100 parts by weight of total monomers. The ratio of the total amount of inorganic peroxide to the total amount of organic peroxide is preferably 1/10 to 10/1, preferably 1/5 to 5/1, more particularly 1/3 to 3/1, as considered over the entire process.

According to one preferred variant, the metering of the organic peroxide is started at a point in time at which already at least 5%, preferably at least 8%, more particularly at least 10% and at most 20% of the vinylaromatic compound has been metered in in a continuous mass flow. The point in time of the addition is therefore independent of whether the polymerization has been initiated with or without an initial charge.

Initiation of the polymerization reaction refers to the start of the polymerization reaction of the monomers present in the polymerization vessel through decomposition of the radical initiator. The polymerization starts, for example, when the polymerization mixture contains monomers and inorganic peroxide and reaches a temperature in the range from ≥80° C. to ≤95° C.

In order to start the polymerization, first of all an aqueous solution is prepared which comprises a portion of protective colloid and/or an emulsifier in dissolved form, optionally a portion of inorganic peroxide, optionally a portion of monomer, and also optionally polystyrene seed. This mixture is heated preferably to the temperature at which the polymerization of the monomers is to take place. As soon as the particular desired polymerization temperature has been reached, or within a time span of 1 to 15 minutes, preferably 1 to 10 minutes, after the attainment of the polymerization temperature, the metering of the monomers and also of the inorganic peroxide is commenced.

According to one preferred embodiment, the polymerization is initiated in an aqueous polymerization mixture which contains up to 5% of the vinylaromatic compound and no aliphatic diene. Accordingly the polymerization starts when
 0.1 to 5% of the vinylaromatic compound has been introduced as an initial charge,
 the reaction temperature has been adjusted to a temperature in the range from ≥80° C. to ≤95° C., and
 inorganic peroxide, preferably 0.1 to 0.5 part by weight of the inorganic peroxide per 100 parts by weight of total monomer, has been introduced in the initial charge.

The sequence in which the conditions are established here is not critical. With particular preference 0.1 to 0.5 part by weight of inorganic peroxide, preferably an ammonium salt or an alkali metal salt of a peroxodisulfate, is selected to initiate the polymerization, and subsequently the vinylaromatic compound and 0.1 to 2 parts by weight of inorganic peroxide are metered in, with the metering of the 0.1 to 2 parts by weight of organic peroxide taking place only from the point in time for which already at least 5% of the vinylaromatic compound has been metered in; the metering of the inorganic peroxide, of the organic peroxide and of the vinylaromatic compound in each case takes place in a continuous mass flow, and the parts by weight of the peroxides are based in each case on 100 parts by weight of total monomers.

As with all radical polymerization reactions, it is advantageous if the introduction of the reaction components as initial charge, the metering/polymerization and also the after-reaction take place in the reaction vessel under inert gas atmosphere, such as under nitrogen or argon atmosphere, for example.

Preferred polymerization conditions are a temperature in the range from ≥75° C. to ≤115° C., preferably ≥80° C. to ≤105° C., more particularly ≥85° C. to ≤100° C. The metering of the conjugated aliphatic diene takes place generally at elevated pressure. The metering of the conjugated aliphatic diene takes place preferably at a pressure in the range from 5 to 15 bar. The effect of the elevated pressure is that, for example, the 1,3-butadiene, which is gaseous under atmospheric pressure and at room temperature, is located largely in the polymerization mixture.

The polymerization may be carried out in the presence of a degraded starch. According to one preferred embodiment, no degraded starch is present during the polymerization. According to a likewise preferred embodiment, the polymerization takes place in the presence of a degraded starch, preferably 15 to 100 parts by weight of a degraded starch per 100 parts by weight of the monomers.

Starting starches for producing the degraded starches for use in the invention suitably include all native starches such as starches from corn, wheat, oats, barley, rice, millet, potatoes, peas, tapioca, sorghum or sago. Also of interest as starting starches are those natural starches which have a high amylopectin content such as waxy corn starch and waxy potato starch. The amylopectin content of these starches is above 90%, usually 95 to 100%.

Furthermore, starches modified by etherification or esterification may be used for preparing the polymer dispersions of the invention. The modification generally also results in a degradation. Such products are known and available commercially. They are produced for example by esterification of native starch or of degraded native starch with organic or inorganic acids, their anhydrides or chlorides. Of particular interest are phosphated and acetylated degraded starches. The most common method for etherifying starches is to treat starch with organic halogen compounds, epoxides or sulfates in aqueous alkaline solution. Known starch ethers are alkyl ethers, hydroxyalkyl ethers, carboxyalkyl ethers and allyl ethers. Also suitable are the reaction products of starches with 2,3-epoxypropyltrimethylammonium chloride.

Other suitable starches are cationically modified starches, i.e., starch compounds containing amino groups or ammonium groups.

The starches may be degraded enzymatically, oxidatively or hydrolytically by exposure to acids or bases. Starch degradation is common knowledge and is described for example in EP 2580257. Degraded starches are available commercially. For the polymerization it is possible to use a degraded starch or to prepare it in situ and then carry out the polymerization in its presence.

Particularly preferred are degraded native starches, especially native starches degraded to maltodextrin.

Preference is given to degraded starches having an intrinsic viscosity $\eta i$ of $\leq 0.07$ dl/g or $\leq 0.05$ dl/g. The intrinsic viscosity $\eta i$ of the degraded starches is preferably in the range from 0.02 to 0.06 dl/g. The intrinsic viscosity $\eta i$ is determined according to DIN EN1628 at a temperature of 23° C.

According to one process variant, the polymerization is carried out in the presence of an aqueous dispersion of finely divided polystyrene. Preference is given to using 0.1 to 5 parts by weight, more particularly 0.2 to 3 parts by weight, based on total monomers. The polymerization is preferably initiated in an initial charge which contains up to 2 parts by weight of aqueous dispersion of finely divided polystyrene, based on 100 parts by weight of total monomers, and subsequently monomers and emulsifier are metered continuously. Preference is given to finely divided polystyrene, polystyrene having a mean particle diameter of 20 to 40 nm (determined by ultracentrifuge). It is assumed that a finely divided polystyrene dispersion of this kind acts as a seed polymer—also referred to as seed latex—and so the polymerization starts in the particles of the seed polymer and a uniform particle growth occurs.

In order to modify the properties of the polymers, the emulsion polymerization may optionally be carried out in the presence of at least one chain transfer agent which is not sulfur-containing or halogen-containing. They are typically used in order to reduce or control the molecular weight of the polymers obtainable by a radical aqueous emulsion polymerization.

The process of the invention is preferably intended not to embrace the use of chain transfer agents selected from aliphatic and/or araliphatic halogen compounds, organic thio compounds and substituted thiols during the polymerization.

Examples of chain transfer agents which are not sulfur-containing or halogen-containing are aldehydes such as formaldehyde, acetaldehyde and propionaldehyde, organic acids such as formic acid, sodium formate or ammonium formate, alcohols such as, in particular, isopropanol, and phosphorus compounds such as sodium hypophosphite. If chain transfer compounds which are not sulfur-containing or halogen-containing are used in the polymerization, the amount used in each case is for example 0.01 to 5, preferably 0.1 to 1 part(s) by weight, based on 100 parts by weight of the monomers used in the polymerization. The chain transfer agents are preferably metered into the initial charge together with the monomers. However, they may also be present partially or entirely in the initial charge. They may also be metered in in stages, with an offset relative to the monomers.

Particularly preferred is a process in which there is no chain transfer agent present during the polymerization.

In order to complete the polymerization reaction, it is sufficient in the majority of cases for the reaction mixture to be stirred for 1 to 3 hours at the polymerization temperature, for example, after the end of the addition of monomer. Subsequently, a conversion of around 95% has typically been achieved.

In order to increase the conversion still further and hence to lower the residual monomer content, it is possible, for example, to add further radical initiator from the group of the abovementioned initiators to the reaction mixture, or to prolong the addition thereof, and to carry out what is called an "after-polymerization", in other words a polymerization, for achieving conversions >95% up to 99%.

An after-polymerization of this kind may be carried out at the same, a lower or else a higher temperature as/than the main polymerization. In this phase, for example, 0.1 to 1.5 parts by weight, based on 100 parts by weight of the monomers used in the polymerization, of inorganic peroxide, preferably sodium peroxodisulfate, are metered in as initiator, and the polymerization temperature is adjusted to a temperature in the range from 80 to 120° C.

The pH during the polymerization may be 1 to 5, for example. After the end of the polymerization, at a conversion >95%, the pH is adjusted for example to a value between 6 and 7.

It is additionally possible to carry out chemical deodorization as well. If traces of residual monomers are to be removed, this may also take place chemically by exposure to aforementioned redox initiator systems and systems of the kind set out in DE-A 44 35 423, DE-A 44 19 518 and also DE-A 44 35 422.

The treatment with the redox initiator system is carried out in the temperature range from 60 to 100° C., preferably at 70 to 90° C. The redox partners may be added to the dispersion independently of one another completely, in portions or continuously over a period of 10 minutes to 4 hours. To improve the after-polymerization effect of the redox initiator systems, it is also possible to add soluble salts of metals of changing valence, such as salts of iron, of copper or of vanadium, to the dispersion. Frequently complexing agents are added as well, and keep the metal salts in solution under the reaction conditions.

Following the polymerization reaction (main polymerization+after-polymerization) and any chemical deodorization, it may be necessary largely to free the aqueous polymer dispersions from odorous substances, such as residual monomers and other volatile organic constituents; this is also referred to as physical deodorization. This may be accomplished in a conventional way physically by distillative removal (more particularly byway of steam distillation) or by stripping with an inert gas.

The present invention also relates to the dispersions obtainable by the process of the invention. A feature of these dispersions is that they are virtually coagulum-free aqueous dispersions. The amount of coagulum is in the ppm range and is preferably less than 100 ppm, more particularly less than 50 ppm.

In addition they generally have a solids content of around 50 wt %, preferably in the range from 45 to 55 wt %. The dispersions of the invention have a low fraction of 4-phenylcyclohexene.

The polymer dispersions obtained in the invention have a polymodal particle distribution.

Obtainable according to the process of the invention are aqueous polymer dispersions in which the fraction of the first population of large polymer particles is 60 to 95 wt % and the fraction of the second population of small polymer particles is 5 to 40 wt %, based on the total polymer of the dispersion.

From looking at the particle size, at least two maxima are apparent. The particle size is analyzed using an analytical ultracentrifuge (AUC).

In a preferred polymer dispersion, the particle size distribution has a peak maximum in the range from 80 to 160 nm, more preferably in the range from 90 to 140 nm, and a second peak maximum in the range from 40 to 80 nm, more preferably in the range from 45 to 70 nm.

The distance between the two peak maxima ought preferably to be not more than 80 nm, more preferably not more than 60 nm.

There is typically no overlap or only a small overlap between the peaks of the large particles and the small particles; an overlap of up to 20% is not detrimental to the desired effect of the good rheology.

The aqueous polymer dispersions of the invention are used as a binder, adhesive, fiber sizing agent, for producing coatings or for producing paper coating slips. The aqueous polymer dispersions of the invention are suitable for sizing both textile fibers and mineral fibers, more particularly glass fibers. On account of their good bond strength, especially when using comonomers which lead to a low copolymer glass transition temperature (e.g., less than 20° C.), they may also be used as an adhesive, for example, for producing laminates and for producing coatings such as, for example, barrier coatings. The aqueous polymer dispersions of the invention are used preferably as binders in paper coating slips.

Another subject of the invention, therefore, is a paper coating slip comprising
  (i) inorganic pigment and
  (ii) an aqueous polymer dispersion described above, obtainable by the process of the invention,
  (iii) and optionally further auxiliaries.

Paper coating slips generally comprise water and also pigments, binders and auxiliaries for establishing the required rheological properties, such as thickeners. The pigments are usually in dispersion in water. The paper coating slip comprises pigments in an amount of preferably at least 80 wt %, e.g., 80 to 95 wt % or 80 to 90 wt %, based on the total solids content.

White pigments in particular are contemplated. Suitable pigments are, for example, metal salt pigments such as calcium sulfate, calcium aluminate sulfate, barium sulfate, magnesium carbonate and calcium carbonate, for example, of which preference is given to carbonate pigments, more particularly calcium carbonate. The calcium carbonate may be natural ground calcium carbonate (GCC), precipitated calcium carbonate (PCC), lime or chalk. Suitable calcium carbonate pigments are available, for example, as Covercarb® 60, Hydrocarb® 60 or Hydrocarb® 90 ME. Examples of other suitable pigments include silicas, aluminum oxides, aluminum hydrate, silicates, titanium dioxide, zinc oxide, kaolin, alumina, talc or silicon dioxide. Suitable further pigments are available, for example, as Capim® MP 50 (clay), Hydragloss® 90 (clay) or Talcum C10.

The paper coating slip comprises the polymer dispersion prepared in the invention as a sole binder or in combination with additional binder. The most important functions of binders in paper coating slips are to join the pigments to the paper and the pigments to one another and in some cases to fill in cavities between pigment particles.

The polymer of the invention (solid, i.e., without water or other solvents liquid at 21° C. and 1 bar) is used for example at 1 to 50 parts by weight, preferably 1 to 25 parts by weight or 5 to 20 parts by weight per 100 parts by weight of pigments.

A preferred paper coating slip comprises the polymers of the aqueous polymer dispersion in an amount of 1 to 50 parts by weight, based on the total amount of pigments, and also comprises pigments in an amount of 80 to 95 parts by weight, based on the total solids content, and also comprises an auxiliary, and the pigment therein is selected from the group consisting of calcium sulfate, calcium aluminate sulfate, barium sulfate, magnesium carbonate, calcium carbonate, silicas, aluminum oxides, aluminum hydrate, silicates, titanium dioxide, zinc oxide, kaolin, alumina, talc and silicon dioxide, and the auxiliary therein is selected from the group consisting of thickeners, additional polymeric binders, co-binders, optical brighteners, fillers, flow control agents, dispersants, surfactants, lubricants, neutralizing agents, defoamers, deaerating agents, preservatives and dyes.

The further synthetic binders, different from the polymers prepared in the invention, are common knowledge and are described for example in D. Urban and K. Takamura, Polymer Dispersions and Their Industrial Applications, 2002, Wiley-VCH Verlag GmbH, Weinheim, section 4.4.4, page 90 ff., the disclosure content of which is hereby expressly referenced.

Additional binders contemplated include natural-based binders, more particularly starch-based binders, and also synthetic binders different from the polymers prepared in the invention, especially emulsion polymers preparable by emulsion polymerization. The starch of starch-based binders in this context is intended to refer to any native, modified or degraded starch. Native starches may consist of amylose, amylopectin or mixtures thereof. Modified starches may be oxidized starch, starch esters or starch ethers. The molar weight of the starch may be reduced by hydrolysis (degraded starch). Degradation products include oligosaccharides and dextrins. Preferred starches are cereal starch, corn starch and potato starch. Particularly preferred are cereal starch and corn starch, with corn starch being especially preferred.

Paper coating slips of the invention may additionally comprise further auxiliaries, examples being fillers, co-binders and thickeners for the further optimization of viscosity and water retention, optical brighteners, dispersants, surfactants, lubricants (e.g., calcium stearate and waxes), neutralizing agents (e.g., NaOH or ammonium hydroxide) for pH adjustment, defoamers, deaerating agents, preservatives (e.g., biocides), flow control agents, dyes (especially soluble dyes), etc. Thickeners contemplated include not only synthetic polymers (e.g., crosslinked polyacrylate), but also, in particular, celluloses, preferably carboxymethylcellulose. Examples of optical brighteners include fluorescent and phosphorus dyes, more particularly stilbenes.

The paper coating slip is preferably an aqueous slip; it comprises water in particular as a result of the actual preparation form of the constituents (aqueous polymer dispersions, aqueous pigment slurries); the desired viscosity may be adjusted by addition of further water. Typical solids contents for the paper coating slips are in the range from 30 to 80 wt %. The pH of the paper coating slip is adjusted preferably to values from 6 to 11, more particularly 7 to 10.

Further subjects of the invention are paper or card coated with a paper coating slip of the invention, and a method for coating paper or card, where an aqueous polymer dispersion is prepared in accordance with the invention; and with this polymer dispersion, at least one pigment and optional further auxiliaries a paper coating slip is produced; and the paper coating slip is applied to at least one surface of paper or card.

The paper coating slip is preferably applied to uncoated base papers or uncoated card. The amount is generally 1 to 50 g, preferably 5 to 30 g (solid, i.e., without water or other solvents which are liquid at 21° C. and 1 bar) per square meter. Coating may take place by typical application methods, such as by means of a size press, film press, blade coater, air brush, doctor blade or spray coater or by curtain coating. Depending on the pigment system, the aqueous dispersions of the water-soluble copolymers may be used in paper coating slips for the base coat and/or for the topcoat.

Paper coating slips of the invention have good performance properties. They run well in paper coating processes and have high binding power. The coated papers and cards have good surface strength, especially very high wet and dry pick resistance. They lend themselves well to printing in the typical printing methods, such as relief printing, gravure, offset, digital, inkjet, flexographic, newsprint, letter press and sublimation printing, in laser printing, electrophotographic printing or a combination of these printing methods.

EXAMPLES

Unless otherwise apparent from the context, the indications in percent always mean percent by weight. The indication of a content relates to the content in aqueous solution or dispersion. Where water was used within the examples, it was demineralized water.

Measurement Methods

Particle Size

The size of the particles in the polymer dispersion and also the particle size distribution were determined using an analytical ultracentrifuge (AUC) with turbidity-based optical system and Mie correction for transmitted intensities per size. With turbidity detection, all components from 30 nm to 5 µm in diameter undergo measurement.

The method uses a homogeneous starting sedimentation. The method was carried out according to the guidelines of ISO 13318-1, with the specific set-up being described in W. Mächtle, L. Börger, "Analytical Ultracentrifugation of Polymers and Nanoparticles" chapter 3, Springer Science and Business Media, Berlin 2006. The evaluation starts from a spherical solid particle morphology of skeletal density which is dictated by the comonomer composition. The results are reported in volume metric in sphere-equivalent diameters.

For the measurement, the dispersions are diluted to a concentration of 4 g (solids)/liter with a 0.05 wt % aqueous surfactant solution and subjected to the measurement under the same conditions.

The weight fraction of a particle population is obtained directly from the integral of the measurement. Below, the fraction of all particles from 36 to 75 nm is considered for the population of the small particles, and the fraction of all particles from 80 to 180 nm is considered for the population of the large particles.

Determining the Viscosity of the Dispersion

The viscosity of the dispersion was determined according to ASTM D2196 with a Brookfield viscometer with RV spindles at 100 rpm and a temperature of 23° C.

Determining the Viscosity of the Coating Slip

The viscosity at high shear rates was measured using a high-pressure capillary viscometer (ACAV high-shear viscometer A2, manufacturer: ACA Systems). Prior to the measurement, the sample is filtered through a 100 µm sieve and then its density is determined. The measurement is carried out at a temperature of 23° C.

Solids Content

Solids contents of the polymer dispersions were determined by distributing 0.5 to 1.5 g of the polymer dispersion in a metal lid with a diameter of 4 cm and then drying it in a forced-air drying cabinet at 140° C. for 30 minutes. The ratio of the mass of the sample after drying under the above conditions to the mass at sampling gives the solids content of the polymer dispersion.

Starting materials used in the examples were as follows:

Emulsifier A: sodium lauryl sulfate as a 15 wt % solution (Disponil® SDS from BASF)

Emulsifier B: ethoxylated sodium lauryl ether sulfate as a 28 wt % solution (Texapon® NSO P from BASF)

Complexing agent: EDTA as a 2 wt % solution (Trilon® BX from BASF)

Seed latex: polystyrene seed in the form of a 29.7 wt % dispersion with a particle size of around 30 nm (determined by analytical ultracentrifuge)

Initiator A: 7 wt % solution of sodium peroxodisulfate (NaPS)

Initiator B: 10 wt % solution of tert-butyl hydroperoxide

Reducing agent: 13 wt % solution of acetone bisulfite

Degraded starch: commercial 72 wt % aqueous glucose syrup having a DE (dextrose equivalent) value of 28

Unless indicated otherwise, the water was deionized water. In all of the examples, the feeds were metered at a uniform volume flow rate.

Preparation of the Emulsion Polymers

The quantities below in pphm (parts per hundred monomer) are based on 100 parts by weight of total monomer.

Example 1 Emulsion Polymerization of Styrene/Butadiene/Acrylic Acid

Initial Charge:

| | |
|---|---|
| 360.01 g | of water |
| 192.86 g | of a 7 wt % aqueous solution of itaconic acid (0.6 pphm) |
| 45.45 g | of a 29.7 wt % dispersion of a polystyrene latex with a mean particle size of 30 nm (0.6 pphm) |
| 18.00 g | of a 15 wt % solution of sodium lauryl sulfate (emulsifier A) (0.12 pphm) |
| 11.25 g | of a 2 wt % solution of EDTA (complexing agent) (0.01 pphm) |
| 4.50 g | of acrylic acid (0.2 pphm) |
| 47.48 g | of styrene (2.11 pphm) |

Addition:

| | |
|---|---|
| 86.79 g | of a 7 wt % solution of sodium peroxodisulfate (initiator A) (0.27 pphm) |

Feed 1:

| | |
|---|---|
| 90.00 g | of acrylic acid (4.0 pphm) |
| 40.18 g | of a 28 wt % solution of ethoxylated sodium lauryl ether sulfate (emulsifier B) (0.5 pphm) |
| 36.00 g | of a 15 wt % solution of sodium lauryl sulfate (0.24 pphm) |
| 22.50 g | of 15 wt % sodium hydroxide solution (0.15 pphm) |
| 503.69 ml | of water |

Feed 2:

| | |
|---|---|
| 1364.63 g | of styrene (60.65 pphm) |

Feed 3:

| | |
|---|---|
| 729.9 g | of butadiene (32.44 pphm) |

Feed 4:

| | |
|---|---|
| 273.21 g | of a 7 wt % solution of sodium peroxodisulfate (initiator A) (0.85 pphm) |

Feed 5:

| | |
|---|---|
| 180.00 g | of a 10 wt % solution of tert-butyl hydroperoxide (initiator B) (0.8 pphm) |

Feed 6 (Emulsifier Shot):

| | |
|---|---|
| 150.00 g | of a 15 wt % solution of sodium lauryl sulfate (1.00 pphm) |

Feed 7:

| | |
|---|---|
| 51.75 g | of a 10 wt % solution of tert-butyl hydroperoxide (initiator B) (0.23 pphm) |

Feed 8:

| | |
|---|---|
| 66.98 g | of a 13.1 wt % solution of acetone bisulfite (0.39 pphm) |

The components of the initial charge were charged to a 6 l pressure reactor and mixed. The initial charge was heated to 90° C. When 90° C. were reached, the initiator A (addition 1) was added slowly and the polymerization commenced.

Started immediately thereafter were feeds 1, 2, 3 and 4 (time: 0 minutes). Feeds 1, 2 and 3 took place over a period of 4 hours. Feed 4 took place over a period of 4 hours and 15 minutes.

Feed 5 was commenced after 30 minutes after the start of feeds 1, 2, 3 and 4 (time: 30 minutes) and took place over 3 hours.

Feed 6 was commenced after 50 minutes after the start of feeds 1, 2, 3 and 4 (time: 50 minutes) and took place over 20 minutes.

15 minutes before the end of feeds 1, 2, 3 and 4 (time: 225 minutes) the polymerization temperature is increased to 100° C. After the end of the metered addition of feed 4, the polymerization mixture was stirred for a further 30 minutes. The polymerization mixture was then heated to a temperature of 90° C. and thereafter 71.59 ml of water (3.19 pphm) and 15.00 g of 15 wt % sodium hydroxide solution (0.10 pphm) were added.

Feeds 7 and 8 were started subsequently and took place over a further 2 hours. After the end of feeds 7 and 8, the polymerization mixture was cooled to room temperature and admixed with 144.00 g of 15 wt % sodium hydroxide solution (0.96 pphm).

The solids content of the dispersion was 53 wt %.

The polymer dispersion was analyzed using an analytical ultracentrifuge:

Bimodal Particle Size Distribution:

The smaller particle population had its peak maximum at 55 nm. The fraction as a proportion of the total polymer was 20 wt %.

The larger particle population had its peak maximum at 117 nm. The fraction as a proportion of the total polymer was 80 wt %.

Inventive Example 2 (Delayed Butadiene Addition)

The emulsion polymerization was carried out as in inventive example 1, with the difference that feed 3 was not started until 30 minutes after the start of feeds 1, 2 and 4 (time: 30 minutes) and took place over 3.5 hours.

Feed 6 was commenced 60 minutes after the start of feeds 1, 2 and 4 (time: 60 minutes) and took place over 20 minutes. In feed 1 an increased amount of sodium hydroxide solution was used (0.25 pphm).

The solids content of the dispersion was 53 wt %.

The polymer dispersion was analyzed using an analytical ultracentrifuge:

Bimodal Particle Size Distribution:

The smaller particle population had its peak maximum at 50 nm. The fraction as a proportion of the total polymer was 27 wt %.

The larger particle population had its peak maximum at 120 nm. The fraction as a proportion of the total polymer was 73 wt %.

Inventive Example 3 (Delayed Butadiene Addition)

The emulsion polymerization was carried out as in inventive example 1, with the difference that feed 3 was not started until 30 minutes after the start of feeds 1, 2 and 4 (time: 30 minutes) and took place over 3.5 hours.

Feed 6 was commenced 40 minutes after the start of feeds 1, 2 and 4 (time: 40 minutes) and took place over 20 minutes. In feed 1 an increased amount of sodium hydroxide solution was used (0.25 pphm).

The solids content of the dispersion was 53 wt %.
The polymer dispersion was analyzed using an analytical ultracentrifuge:
Bimodal Particle Size Distribution:
The smaller particle population had its peak maximum at 56 nm. The fraction as a proportion of the total polymer was 24 wt %.
The larger particle population had its peak maximum at 118 nm. The fraction as a proportion of the total polymer was 76 wt %.

Inventive Example 4

The emulsion polymerization was carried out as in inventive example 1, with the difference that feed 6 was not started until 40 minutes after the start of feeds 1, 2, 3 and 4 (time: 40 minutes) and was metered over 20 minutes. In feed 1 an increased amount of sodium hydroxide solution was used (0.25 pphm).

The solids content of the dispersion was 53 wt %.
The polymer dispersion was analyzed using an analytical ultracentrifuge:
Bimodal Particle Size Distribution:
The smaller particle population had its peak maximum at 58 nm. The fraction as a proportion of the total polymer was 30 wt %.
The larger particle population had its peak maximum at 118 nm. The fraction as a proportion of the total polymer was 70 wt %.

Inventive Example 5

The emulsion polymerization was carried out as in inventive example 1, with the difference that feed 6 comprised 90.00 g of a 15 wt % solution of sodium lauryl sulfate (0.6 pphm), metered in over a period of 20 minutes.

The solids content of the dispersion was 53 wt %.
The polymer dispersion was analyzed using an analytical ultracentrifuge:
Bimodal Particle Size Distribution:
The smaller particle population had its peak maximum at 56 nm. The fraction as a proportion of the total polymer was 16 wt %.
The larger particle population had its peak maximum at 116 nm. The fraction as a proportion of the total polymer was 84 wt %.

Inventive Example 6

The emulsion polymerization was carried out as in inventive example 1, with the difference that the seed latex used in the initial charge was 75.75 g of a 29.7 wt % dispersion of a polystyrene latex having a mean particle size of 30 nm (1.0 pphm).

The solids content of the dispersion was 53 wt %.
The polymer dispersion was analyzed using an analytical ultracentrifuge:
Bimodal Particle Size Distribution:
The smaller particle population had its peak maximum at 50 nm. The fraction as a proportion of the total polymer was 10 wt %.
The larger particle population had its peak maximum at 100 nm. The fraction as a proportion of the total polymer was 90 wt %.

Comparative Example C1 (without Emulsifier Shot)

Initial Charge:

| | |
|---|---|
| 360.01 g | of water |
| 11.25 g | of a 2 wt % solution of EDTA (complexing agent) (0.01 pphm) |
| 18.00 g | of a 15 wt % solution of sodium lauryl sulfate (emulsifier A) (0.12 pphm) |
| 192.86 g | of a 7 wt % aqueous solution of itaconic acid (0.6 pphm) |
| 45.45 g | of a 29.7 wt % dispersion of a polystyrene latex with a mean particle size of 30 nm (0.6 pphm) |
| 4.50 g | of acrylic acid (0.2 pphm) |
| 47.48 g | of styrene (2.11 pphm) |

Addition:

| | |
|---|---|
| 86.79 g | of a 7 wt % solution of sodium peroxodisulfate (initiator A) (0.27 pphm) |

Feed 1:

| | |
|---|---|
| 90.00 g | of acrylic acid (4.0 pphm) |
| 40.18 g | of a 28 wt % solution of ethoxylated sodium lauryl ether sulfate (emulsifier B) (0.5 pphm) |
| 36.00 g | of a 15 wt % solution of sodium lauryl sulfate (0.24 pphm) |
| 37.5 g | of 15 wt % sodium hydroxide solution (0.15 pphm) |
| 597.91 ml | of water |

Feed 2:

| | |
|---|---|
| 1252.13 g | of styrene (55.65 pphm) |

Feed 3:

| | |
|---|---|
| 842.4 g | of butadiene (37.44 pphm) |

Feed 4:

| | |
|---|---|
| 273.21 g | of a 7 wt % solution of sodium peroxodisulfate (initiator A) (0.85 pphm) |

Feed 5:

| | |
|---|---|
| 180.00 g | of a 10 wt % solution of tert-butyl hydroperoxide (initiator B) (0.8 pphm) |

Feed 6:

| | |
|---|---|
| 51.75 g | of a 10 wt % solution of tert-butyl hydroperoxide (initiator B) (0.23 pphm) |

Feed 7:

| | |
|---|---|
| 66.98 g | of a 13.1 wt % solution of acetone bisulfite (0.39 pphm) |

The components of the initial charge were charged to a 6 l pressure reactor and mixed. The initial charge was heated to 90° C. When 90° C. were reached, the initiator A (addition 1) was added slowly and the polymerization commenced.

Started immediately thereafter were feeds 1, 2 and 4 (time: 0 minutes). Feeds 1 and 2 took place over a period of 4 hours.

Feed 3 started 30 minutes after the start of feeds 1, 2 and 4 (time: 30 minutes) and took place over 3.5 hours.

Feed 4 took place over a period of 4 hours and 15 minutes.

Feed 5 was commenced after 30 minutes after the start of feeds 1, 2 and 4 (time: 30 minutes) and took place over 3 hours.

15 minutes before the end of feeds 1, 2 and 3 (time: 225 minutes) the polymerization temperature was increased to 100° C. After the end of the metered addition of feed 4, the polymerization mixture was stirred for a further 30 minutes. The polymerization mixture was then heated to a temperature of 90° C. and thereafter 71.59 ml of water and 15.00 g of 15 wt % sodium hydroxide solution (0.10 pphm) were added.

Feeds 6 and 7 were started subsequently and took place over a further 2 hours. After the end of feeds 6 and 7, the polymerization mixture was cooled to room temperature and subsequently admixed with 144.00 g of 15 wt % sodium hydroxide solution (0.96 pphm).

A monomodal dispersion was obtained. The solids content of the dispersion was 53 wt %.

The mean particle size $D_{50}$ (determined by means of AUC) of the dispersion particles: 128 nm.

Comparative Example C2 (without Emulsifier Shot)

Initial Charge:

| | |
|---|---|
| 360.01 g | of water |
| 11.25 g | of a 2 wt % solution of EDTA (complexing agent) (0.01 pphm) |
| 18.00 g | of a 15 wt % solution of sodium lauryl sulfate (emulsifier A) (0.12 pphm) |
| 192.86 g | of a 7 wt % aqueous solution of itaconic acid (0.6 pphm) |
| 189.39 g | of a 29.7 wt % dispersion of a polystyrene latex with a mean particle size of 30 nm (2.50 pphm) |
| 4.50 g | of acrylic acid (0.2 pphm) |
| 47.48 g | of styrene (2.11 pphm) |

Addition:

| | |
|---|---|
| 86.79 g | of a 7 wt % solution of sodium peroxodisulfate (initiator A) (0.27 pphm) |

Feed 1:

| | |
|---|---|
| 90.00 g | of acrylic acid (4.0 pphm) |
| 40.18 g | of a 28 wt % solution of ethoxylated sodium lauryl ether sulfate (emulsifier B) (0.5 pphm) |

-continued

| | |
|---|---|
| 36.00 g | of a 15 wt % solution of sodium lauryl sulfate (0.24 pphm) |
| 37.5 g | of 15 wt % sodium hydroxide solution (0.25 pphm) |
| 547.96 ml | of water |

Feed 2:

| | |
|---|---|
| 1252.13 g | of styrene (55.65 pphm) |

Feed 3:

| | |
|---|---|
| 842.4 g | of butadiene (37.44 pphm) |

Feed 4:

| | |
|---|---|
| 273.21 g | of a 7 wt % solution of sodium peroxodisulfate (initiator A) (0.85 pphm) |

Feed 5:

| | |
|---|---|
| 180.00 g | of a 10 wt % solution of tert-butyl hydroperoxide (initiator B) (0.8 pphm) |

Feed 6:

| | |
|---|---|
| 51.75 g | of a 10 wt % solution of tert-butyl hydroperoxide (initiator B) (0.23 pphm) |

Feed 7:

| | |
|---|---|
| 66.98 g | of a 13.1 wt % solution of acetone bisulfite (0.39 pphm) |

The components of the initial charge were charged to a 6 l pressure reactor and mixed. The initial charge was heated to 90° C. When 90° C. were reached, the initiator A (addition 1) was added slowly and the polymerization commenced.

Started immediately thereafter were feeds 1, 2 and 4 (time: 0 minutes). Feeds 1 and 2 took place over a period of 4 hours.

Feed 3 started 30 minutes after the start of feeds 1, 2 and 4 (time: 30 minutes) and took place over 3.5 hours.

Feed 4 took place over a period of 4 hours and 15 minutes.

Feed 5 was commenced after 30 minutes after the start of feeds 1, 2 and 4 (time: 30 minutes) and took place over 3 hours.

15 minutes before the end of feeds 1, 2 and 3 (time: 225 minutes) the polymerization temperature was increased to 100° C. After the end of the metered addition of feed 4, the polymerization mixture was stirred for a further 30 minutes. The polymerization mixture was then heated to a temperature of 90° C. and thereafter 71.59 ml of water and 15.00 g of 15 wt % sodium hydroxide solution (0.10 pphm) were added.

Feeds 6 and 7 were started subsequently and took place over a further 2 hours. After the end of feeds 6 and 7, the polymerization mixture was cooled to room temperature and subsequently admixed with 129.00 g of 15 wt % sodium hydroxide solution (0.86 pphm).

The dispersion has coagulated.

TABLE 1

Start of metering of emulsifier shot by time, and amount of monomer metered in, in the individual examples

| Ex. | Commencement of "emulsifier shot" after x min | Start from y % total monomer metering time | Start from z % of total monomer amount* | "Emulsifier shot" x times the metering rate in P1 |
|---|---|---|---|---|
| 1 | 50 | 20.83 | 20.83 | 16.66 |
| 2 | 60 | 25 | 21.42 | 16.66 |
| 3 | 40 | 16.66 | 15.42 | 16.66 |
| 4 | 40 | 16.66 | 16.66 | 16.66 |
| 5 | 50 | 20.83 | 20.83 | 10 |
| 6 | 50 | 20.83 | 20.83 | 16.66 |
| C1 | none | — | — | — |

*without monomers in the initial charge

Production of Coating Slips S1 to S6 and SC1

Coating slips were produced with the dispersions obtained from the examples, these slips consisting of 100 parts by weight of precipitated calcium carbonate (Opacarb A 40), 9.5 parts by weight of binder (example dispersion, solids), 0.5 part by weight of calcium stearate (Ombrelub), 0.25 part by weight of thickener (Sterocoll FS) and 0.1 part of dispersant (Sokalan CP 10). All weight figures are based on the respective solids content of the components.

The solids content of the coating slip was 66 wt % and the pH was 8.8.

The viscosity at high shear rates was measured using a capillary viscometer (ACAV).

TABLE 2

Viscosity of coating slip at high shear rates

| Ex. | Dispersion ex. | Viscosity at a shear rate of 500 000 $s^{-1}$ [mPa s] | Viscosity at a shear rate of 620 000 $s^{-1}$ [mPa s] |
|---|---|---|---|
| S1 | 1 | 118 | 109 |
| S2 | 2 | 115 | 114 |
| S3 | 3 | 124 | 123 |
| S4 | 4 | 114 | 108 |
| S5 | 5 | 115 | 110 |
| S6 | 6 | 106 | 100 |
| SC1 | C1 | 150 | not measurable |

As can be seen from the table, all of inventive coating slips S1 to S6 formulated with the dispersions of the invention have a low viscosity at high shear rates and therefore have very good rheological behavior. The coating slip formulated with the monomodal dispersion of comparative example C1 resulted in significantly higher viscosities and is no longer measurable at a shear rate of 620 000 $s^{-1}$.

What is claimed is:

1. A process for preparing an aqueous polymer dispersion having a polymodal particle distribution of the polymer particles, with a first population of large polymer particles and a second population of small polymer particles, by radically initiated aqueous emulsion polymerization, which comprises polymerizing (a) 40 to 75 parts by weight of at least one vinylaromatic compound,
(b) 24.9 to 59.9 parts by weight of at least one conjugated aliphatic diene,
(c) 0.1 to 10 parts by weight of at least one monomer containing acid groups, and
(d) 0 to 20 parts by weight of at least one other monoethylenically unsaturated monomer, where the amounts of the monomers (a) to (d) add up to 100 parts by weight, in an aqueous medium by a monomer feed process, with the proviso that
monomers and emulsifier are metered continuously in to the aqueous medium and
following a period P1, when 15 to 30% of the total monomer metering time has elapsed and 15 to 30 wt % of the total monomer amount has been metered in, the metering rate of the emulsifier is increased for a period P2 lasting no longer than 30 minutes to 10 to 100 times the average metering rate of the emulsifier in the period P1.

2. The process according to claim 1, wherein the vinylaromatic compound is styrene and/or methylstyrene and the conjugated aliphatic diene is 1,3-butadiene and/or isoprene.

3. The process according to claim 1, wherein the polymerization is initiated in an initial charge which contains up to 20 parts by weight of the total monomers and subsequently monomers and emulsifier are metered continuously.

4. The process according to claim 1, wherein the emulsifier is selected from the group consisting of alkali metal salts and ammonium salts of $C_8$-$C_{22}$ alkyl sulfates, alkali metal salts and ammonium salts of sulfuric monoesters with ethoxylated $C_{12}$-$C_{18}$ alkanols (EO degree: 2 to 40), alkali metal salts and ammonium salts of sulfuric monoesters with ethoxylated $C_4$-$C_9$ alkylphenols (EO degree: 10 to 40), and bis(phenylsulfonic acid) ethers and/or the alkali metal salts or ammonium salts thereof which carry a $C_4$-$C_{24}$ alkyl group on one or both aromatic rings.

5. The process according to claim 1, wherein the emulsifier and at least one monomer are metered together as a mixture.

6. The process according to claim 1, wherein 0.1 to 5 parts by weight of emulsifier per 100 parts by weight of monomers are metered continuously in a mixture with at least one monomer.

7. The process according to claim 1, wherein during the period P2 the metering rate of the emulsifier is 20 to 90 times the average metering rate of the emulsifier in the period P1.

8. The process according to claim 1, wherein polymerization takes place in the presence of at least one inorganic peroxide and also at least one organic peroxide.

9. The process according to claim 1, wherein no reducing agent that can form a red/ox initiator system with the organic or inorganic peroxides is present during the monomer feed.

10. The process according to claim 1, wherein polymerization takes place at a temperature in the range from 80° C. to 115° C.

11. The process according to claim 1, wherein the polymerization is initiated in an initial charge containing up to 2 parts by weight of finely divided polystyrene per 100 parts by weight of total monomers and then monomers and emulsifier are metered continuously.

12. The process according to claim 1, wherein no chain transfer agent selected from aliphatic and/or araliphatic halogen compounds, organic thio compounds and substituted thiols is used during the polymerization.

* * * * *